(12) United States Patent
Matsueda et al.

(10) Patent No.: US 8,741,799 B2
(45) Date of Patent: Jun. 3, 2014

(54) EXHAUST GAS-PURIFYING CATALYST

(75) Inventors: Satoshi Matsueda, Kakegawa (JP);
Akimasa Hirai, Kakegawa (JP); Kenichi Taki, Kakegawa (JP); Yuji Yabuzaki, Kakegawa (JP)

(73) Assignee: Cataler Corporation, Shizuoka (JP)

( * ) Notice: Subject to any disclaimer, the term of this patent is extended or adjusted under 35 U.S.C. 154(b) by 0 days.

(21) Appl. No.: 13/305,255

(22) Filed: Nov. 28, 2011

(65) Prior Publication Data

US 2012/0071318 A1  Mar. 22, 2012

Related U.S. Application Data

(63) Continuation of application No. PCT/JP2010/059017, filed on May 27, 2010.

(30) Foreign Application Priority Data

May 27, 2009   (JP) .................................. 2009-127311

(51) Int. Cl.
| | | |
|---|---|---|
| B01J 27/053 | (2006.01) | |
| B01J 23/26 | (2006.01) | |
| B01D 53/94 | (2006.01) | |
| B01J 23/58 | (2006.01) | |
| B01J 35/02 | (2006.01) | |
| B01J 37/02 | (2006.01) | |

(52) U.S. Cl.
CPC .............. B01D 53/945 (2013.01); B01J 23/58 (2013.01); B01J 27/053 (2013.01); B01J 35/023 (2013.01); B01J 37/0215 (2013.01); B01D 2255/1021 (2013.01); B01D 2255/1023 (2013.01); B01D 2255/1025 (2013.01); B01D 2255/2042 (2013.01); B01D 2255/9022 (2013.01); B01D 2255/908 (2013.01); F01N 2370/02 (2013.01); F01N 2510/0684 (2013.01)
USPC ............ 502/170; 502/217; 502/325; 502/339

(58) Field of Classification Search
USPC .................... 502/325, 339, 170, 217
See application file for complete search history.

(56) References Cited

U.S. PATENT DOCUMENTS

| | | | | |
|---|---|---|---|---|
| 6,040,265 | A * | 3/2000 | Nunan ........................... | 502/242 |
| 6,413,904 | B1 | 7/2002 | Strehlau et al. | |
| 8,187,996 | B2 * | 5/2012 | Matsueda et al. ............ | 502/304 |
| 2002/0039966 | A1 * | 4/2002 | Tanaka et al. ................. | 502/332 |
| 2006/0288650 | A1 * | 12/2006 | Tanaka et al. .................. | 51/309 |
| 2008/0042104 | A1 | 2/2008 | Chen et al. | |

FOREIGN PATENT DOCUMENTS

| | | |
|---|---|---|
| CN | 1891339 A | 1/2007 |
| EP | 0 303 495 A1 | 2/1989 |
| JP | 64-058349 A | 3/1989 |
| JP | 11-207183 | 8/1999 |
| JP | 2000-117110 A | 4/2000 |
| JP | 2001-506177 A | 5/2001 |
| JP | 2007-007496 A | 1/2007 |

OTHER PUBLICATIONS

International Search Report mailed by the International Searching Authority (ISA/JP) on Aug. 10, 2010 in connection with PCT International Application No. PCT/JP2010/059017, filed May 27, 2010.
Written Opinion of the International Searching Authority mailed by the International Searching Authority (ISA/JP) on Aug. 10, 2010 in connection with PCT International Application No. PCT/JP2010/059017, filed May 27, 2010.
Notification of Transmittal of Translation of the International Preliminary Report on Patentability and International Preliminary Report on Patentability, in connection with PCT/JP2010/059017, issued Dec. 22, 2011.
Official Action (with English Translation) dated Mar. 15, 2013 in connection with Chinese Patent Application No. 201080022828.7.
Extended European Search Report, including Supplementary Search Report and European Search Opinion, in connection with European Patent Application No. 10780612.7, issued Jul. 2, 2013.

* cited by examiner

*Primary Examiner* — Jun Li
(74) *Attorney, Agent, or Firm* — John P. White; Cooper & Dunham LLP

(57) ABSTRACT

An exhaust gas-purifying catalyst includes a substrate, and a catalytic layer facing the substrate and including a precious metal, alumina, an oxygen storage material, and a sulfate of an alkaline-earth metal having an average particle diameter falling within a range of 0.01 to 0.70 μm, the average particle diameter being obtained by observation using a scanning electron microscope. Another exhaust gas-purifying catalyst includes a substrate, and a catalytic layer formed on the substrate using slurry containing a precious metal, alumina, an oxygen storage material, and a sulfate of an alkaline-earth metal having an average particle diameter falling within a range of 0.01 to 0.70 μm, the average particle diameter being obtained by observation using a scanning electron microscope.

10 Claims, 3 Drawing Sheets

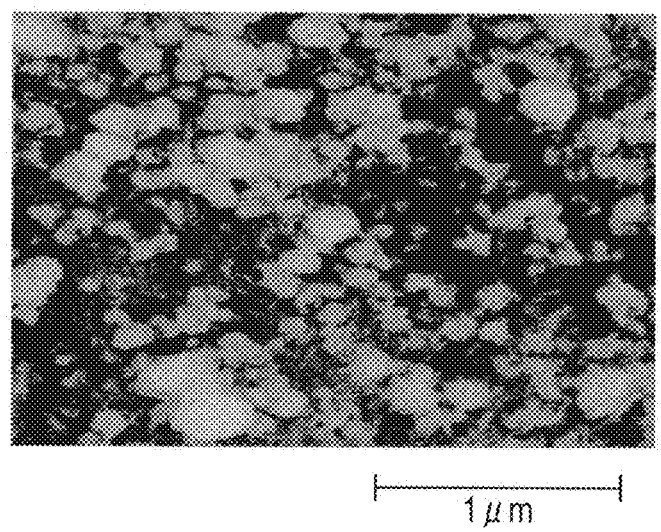
F I G. 4
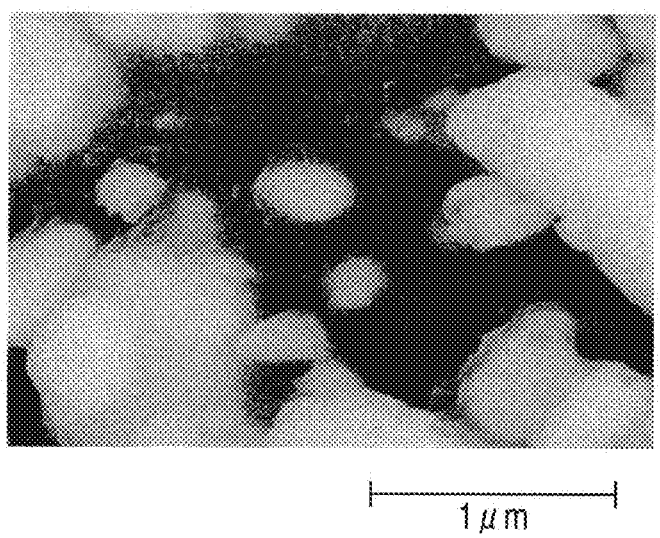
F I G. 5

EXHAUST GAS-PURIFYING CATALYST

CROSS REFERENCE TO RELATED APPLICATIONS

This application is a Continuation Application of PCT Application No. PCT/JP2010/059017, filed May 27, 2010 and based upon and claiming the benefit of priority from prior Japanese Patent Application No. 2009-127311, filed May 27, 2009, the entire contents of all of which are incorporated herein by reference.

BACKGROUND OF THE INVENTION

1. Field of the Invention

The present invention relates to an exhaust gas-purifying catalyst.

2. Description of the Related Art

Emission controls on automobiles, etc. have been tightened in recent years. Therefore, in order to address this issue, various exhaust gas-purifying catalysts for purifying hydrocarbons (HC), carbon monoxide (CO), nitrogen oxides ($NO_x$), etc. contained in an exhaust gas have been developed.

Most exhaust gas-purifying catalysts contain precious metals as catalytic metals. The precious metals play a role in promoting oxidation reactions of HC and CO and reduction reactions of $NO_x$.

The precious metals, however have a problem that they are susceptible to poisoning by HC in the exhaust gas. When the precious metals are poisoned by HC, the reduction reaction of $NO_x$ on these precious metals becomes less prone to occur. Therefore, a catalyst containing precious metals sometimes shows an insufficient $NO_x$ purification efficiency specifically under a rich atmosphere in which the exhaust gas contains HC at a high concentration.

In order to suppress this, proposed is a technique in which a salt of an alkaline-earth metal element is added to a catalyst containing these precious metals (see, for example, Patent document 1). When such a composition is employed, the alkaline-earth metal element acts to suppress the poisoning of the precious metals by HC, and thus exhaust gas purification performances such as an $NO_x$ purification efficiency can be improved to some extent.

The exhaust gas-purifying catalysts, however, have room for further improvement in the exhaust gas purification performances.

PRIOR ART DOCUMENT

Patent Document

Patent document 1: Jpn. Pat. Appln. KOKAI Publication No. 11-207183

BRIEF SUMMARY OF THE INVENTION

An object of the present invention is to provide a technique that makes it possible to achieve a higher performance in purifying exhaust gas.

According to a first aspect of the present invention, there is provided an exhaust gas-purifying catalyst comprising a substrate, and a catalytic layer facing the substrate and including a precious metal, alumina, an oxygen storage material, and a sulfate of an alkaline-earth metal having an average particle diameter falling within a range of 0.01 to 0.70 µm, the average particle diameter being obtained by observation using a scanning electron microscope (SEM).

According to a second aspect of the present invention, there is provided an exhaust gas-purifying catalyst comprising a substrate, and a catalytic layer formed on the substrate using slurry containing a precious metal, alumina, an oxygen storage material, and a sulfate of an alkaline-earth metal having an average particle diameter falling within a range of 0.01 to 0.70 µm, the average particle diameter being obtained by observation using SEM.

According to a third aspect of the present invention, there is provided a method of manufacturing an exhaust gas-purifying catalyst, comprising forming a catalytic layer on a substrate using slurry containing a precious metal, alumina, an oxygen storage material, and a sulfate of an alkaline-earth metal having an average particle diameter falling within a range of 0.01 to 0.70 µm, the average particle diameter being obtained by observation using SEM.

BRIEF DESCRIPTION OF THE SEVERAL VIEWS OF THE DRAWING

FIG. 4 is a SEM photograph of a surface of a catalytic layer of a catalyst according to Example 2;

FIG. 5 is a SEM photograph of a surface of a catalytic layer of a catalyst according to Example 19.

DETAILED DESCRIPTION OF THE INVENTION

Figure 1:
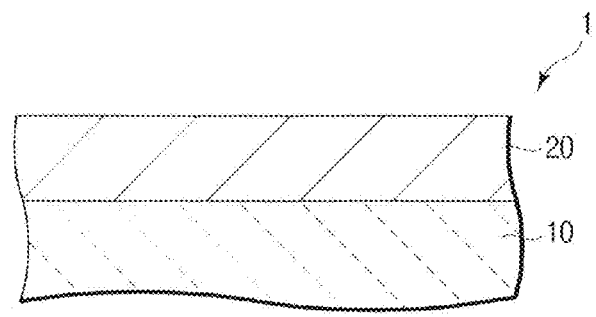
FIG. 1 is a cross-sectional view schematically showing an exhaust gas-purifying catalyst according to a first embodiment of the present invention.

Embodiments of the present invention will be described below with reference to the drawings. In the drawings, the same reference symbols denote components having the same or similar functions and duplicate descriptions will be omitted. Furthermore, the "composite oxide" used herein means a substance in which a plurality of oxides form a solid solution rather than a substance in which the oxides are merely mixed physically. In addition, the "alkaline-earth metal" encompasses beryllium and magnesium.

FIG. 1 is a cross-sectional view schematically showing an exhaust gas-purifying catalyst according to a first embodiment of the present invention.

The exhaust gas-purifying catalyst 1 includes a substrate 10, and a catalytic layer 20 facing the substrate 10.

As the substrate 10, for example, a monolith honeycomb substrate is used. Typically, the substrate is made of a ceramic such as cordierite.

The catalytic layer 20 includes a precious metal, alumina, an oxygen storage material, and a sulfate of an alkaline-earth metal.

The precious metal plays a role in catalyzing the oxidation reactions of HC and CO and the reduction reactions of $NO_x$. As the precious metal, for example, a platinum group metal is used. Typically, used as the precious metal is palladium, platinum, rhodium, or a combination of two or more of them.

The alumina serves as a carrier for supporting the precious metal. That is, the alumina plays a role in increasing the specific surface area of the precious metal and dissipating heat generated by the reactions to suppress the sintering of the precious metal.

The oxygen storage material plays a role in reducing the fluctuations of the air-fuel ratio in the exhaust gas by occluding oxygen in the exhaust gas and releasing it into the exhaust gas. As the oxygen storage material, for example, cerium oxide, zirconium oxide, or a composite oxide thereof is used. Alternatively, as the oxygen storage material, a rare-earth oxide such as praseodymium oxide, a transition metal oxide such as iron oxide or manganese oxide, or a composite oxide thereof may be used. Typically, an oxide containing cerium, for example, a composite oxide of cerium oxide and zirconium oxide is used as the oxygen storage material.

The alkaline-earth metal plays a role in suppressing HC poisoning of the precious metal. As the alkaline-earth metal, for example, barium, calcium, strontium, beryllium, magnesium, or a combination of two or more of them is used. Typically, barium is used as the alkaline-earth metal.

The sulfate of the alkaline-earth metal contained in the catalytic layer 20 has an average particle diameter obtained by SEM observation falling within a range of 0.01 to 0.70 μm. More preferably, the average particle diameter d' falls within a range of 0.05 to 0.40 μm.

When the average particle diameter d' is large, the precious metal and the alkaline-earth metal are less prone to be in contact with each other, and thus there is a possibility that the effect of the alkaline-earth metal on suppressing the HC poisoning of the precious metal is insufficient. In the case where the average particle diameter d' is excessively small, there is a possibility that the reaction of the sulfate of the alkaline-earth metal with the alumina and/or oxygen storage material during the production makes the effect of the alkaline-earth metal on suppressing the HC poisoning of the precious metal insufficient due to the fact that a composite oxide of the above materials is produced.

Note that the "average particle diameter d' obtained by SEM observation" is obtained as follows. First, a sample is placed on a stage of the SEM. Subsequently, the sample is observed, for example, at a 2,500 to 50,000-fold magnification to obtain an SEM image. Of the particles in the SEM image of the sample, the particles each including no portion that cannot be observed due to another particle overlying thereon are selected, and an area $A_k$ of each selected particle is measured (k=1, 2, ..., n; n is the number of the particles in the SEM image of the sample each of which includes no portion that cannot be observed due to another particle overlying thereon). Then, the diameters $d_k$ of the equivalent circles having the same areas as the areas $A_k$ are obtained. That is, the particle diameters $d_k$ satisfying the following formula are obtained. Thereafter, the arithmetical average value of the particle diameters $d_k$ for the particle number of n is calculated to obtain the particle diameter corresponding to the SEM image.

$$A_k = \pi \times \left(\frac{d_k}{2}\right)^2$$

The same SEM observations as that described above are performed at 100 positions on the sample selected randomly. Then, the particle diameters are obtained for the respective SEM images by the above-described method, and an arithmetical average value is calculated therefrom. Thus, the average particle diameter d' is obtained. Here, a standard deviation of the particle diameters of the sulfate of the alkaline-earth metal is set at 0.25 μm or less.

The alkaline-earth metal content per volumetric capacity of the substrate 10 is set within preferably a range of 0.1 to 80 g/L, and more preferably a range of 1 to 40 g/L. When the content is excessively decreased or increased, there is a possibility that the performance of the exhaust gas-purifying catalyst in purifying the exhaust gas is lowered.

A mass ratio of the alkaline-earth metal to the precious metal is set within preferably a range of 0.1 to 80, and more preferably a range of 0.5 to 40. When the mass ratio is excessively decreased or increased, there is a possibility that the performance of the exhaust gas-purifying catalyst in purifying the exhaust gas is lowered.

The catalytic layer 20 may further include a rare-earth element. The rare-earth element has a function of improving the $NO_x$ purification performance of the exhaust gas-purifying catalyst 1 without lowering the HC purification performance thereof. As the rare-earth element, for example, neodymium, lanthanum, praseodymium or yttrium is used. The rare-earth elements are introduced in the above-described oxygen storage material as the constituents thereof.

The catalytic layer 20 may further include zeolite. Zeolite has a large specific surface area and is excellent in performance of adsorbing HC in the exhaust gas. Therefore, the HC purification performance of the exhaust gas-purifying catalyst 1 can be further improved by incorporating zeolite.

The catalytic layer 20 may further include a binder. The binder plays a role in strengthening the bonds among particles in the catalytic layer 20 to improve the endurance of the exhaust gas-purifying catalyst 1. As the binder, for example, an alumina sol, a titania sol or a silica sol is used.

The exhaust gas-purifying catalyst 1 is manufactured by, for example, the following method.

First, a substrate 10 is prepared. Next, the substrate 10 is coated with slurry containing a precious metal, alumina, an oxygen storage material, and a sulfate of an alkaline-earth metal having an average particle diameter d obtained by SEM observation of 0.01 to 0.70 μm. Then, the resultant structure is subjected to drying and firing treatments. Thus, a catalytic layer 20 s formed on the substrate 10. As above, the exhaust gas-purifying catalyst 1 is obtained.

In the case where palladium is used as the precious metal, for preparing the above-mentioned slurry, for example, a palladium salt such as palladium nitrate or a palladium complex is used as a palladium source. In the case where platinum is used as the precious metal, for preparing the above-mentioned slurry, for example, a platinum complex or platinum salt such as dinitrodiamine platinum nitrate is used as a platinum source. In the case where rhodium is used as the precious metal, for preparing the above-mentioned slurry, for example, a rhodium salt such as rhodium nitrate or a rhodium complex is used as a rhodium source.

As described above, the sulfate of the alkaline-earth metal used as a raw material of the above-described slurry has an average particle diameter d obtained by SEM observation falling within a range of 0.01 to 0.70 μm. More preferably, the average particle diameter d falls within a range of 0.05 to 0.40 μm.

When the average particle diameter d is large, the precious metal and the alkaline-earth metal are less prone to be in contact with each other, and thus there is a possibility that the effect of the alkaline-earth metal on suppressing the HC poisoning of the precious metal is insufficient. In the case where the average particle diameter d is excessively small, there is a possibility that the reaction of the sulfate of the alkaline-earth metal with the alumina and/or oxygen storage material produces a composite oxide to make the effect of the alkaline-earth metal on suppressing the HC poisoning of the precious metal insufficient.

Note that the "average particle diameter d obtained by SEM observation" is obtained by the same method as that described for the average particle diameter d'.

According to the present invention, the alkaline-earth metal is introduced in the slurry in a form of sulfate. The present inventors have compared the case of introducing the alkaline-earth metal in the slurry in a form of sulfate with the case of introducing the alkaline-earth metal in the slurry in another form such as acetate, nitrate or carbonate. As a result, it was found out that when a sulfate was used, aggregation of alkaline-earth metal was suppressed, and thus the average particle diameter d' of the alkaline-earth metal salt contained in the catalytic layer 20 could be set within a range of 0.01 to 0.70 μm. Further, it was found out that in the case of using a sulfate, a higher performance in purifying exhaust gas could be achieved as compared with the case of using other salts. Although the reason is not exactly revealed, the present inventors presume it as follows.

Acetates and nitrates of alkaline-earth metals have a high degree of solubility in water. Thus, in the case where water is used as a dispersion medium of slurry, most part of the acetates and nitrates of the alkaline-earth metals are dissolved in the dispersion medium of the slurry. Therefore, in this case, when at least a part of the dispersion medium is removed in the step of drying the slurry, which will be described later, precipitation and particle growth of the alkaline-earth metals occurs. That is, in this case, the aggregation of the alkaline-earth metals is prone to occur in the step of drying the slurry.

On the other hand, carbonates of alkaline-earth metals have a high degree of solubility in an acidic aqueous solution. Thus, in the case where water is used as a dispersion medium of slurry and the liquid constituents of the slurry is acidic, most part of the carbonates are dissolved in the dispersion medium of the slurry. Therefore, also in this case, most part of the carbonates of the alkaline-earth metals is present the dispersion medium of the slurry in a dissolved state. Thus, in this case, the aggregation of the alkaline-earth metals is also prone to occur in the step of drying the slurry.

By contrast, sulfates of alkaline-earth metals have a low degree of solubility in water and an acidic aqueous solution. For this reason, in the case of using a sulfate of an alkaline-earth metal, the aggregation of the alkaline-earth metals is less prone to occur in the step of drying the slurry different from the case of using a salt having a relatively high degree of solubility in water or an acidic aqueous solution. Thus, in this case, much more alkaline-earth metal can be in contact with the precious metal in the catalytic layer 20 as compared with the case of using a salt having a relatively high degree of solubility in water or an acidic aqueous solution. Therefore, in this case, it is possible to more effectively suppress HC poisoning of the precious metal by the alkaline-earth metal and thus to achieve an excellent performance in purifying exhaust gas.

Preferably, the slurry further contains citric acid. The present inventors have found that in the case where a catalytic layer is formed using slurry that contains citric acid, a higher performance in purifying exhaust gas can be achieved as compared with the case where citric acid is omitted. Although the reason is not exactly revealed, the present inventors presume it as follows.

Citric acid is a multi-functional organic acid having three carboxy groups. The carboxy groups can be changed into negatively charged carboxylates in the dispersion medium of the slurry. A part of the carboxylates can electrically interact with the alumina and/or oxygen storage material supporting the precious metal in the slurry. Further, another part of the carboxylates can electrically interact with the sulfate of the alkaline-earth metal in the slurry. Thus, by reason of the interactions, citric acid allows to form cross-links between the alumina and/or oxygen storage material supporting the precious metal and the sulfate of the alkaline-earth metal so as to make them closer to each other. Consequently, the possibility that the alkaline-earth metal and the precious metal are in contact with each other in the catalytic layer 20 is increased. Therefore, it is possible to more effectively suppress HC poisoning of the precious metal by the alkaline-earth metal and thus to achieve an excellent performance in purifying exhaust gas.

Note that in the case of using another multi-functional organic acid having a comparatively high molecular weight instead of citric acid, it is possible that the viscosity of the slurry is excessively high, and thus formation of the catalytic layer 20 is difficult. In the case where citric acid is introduced into the slurry in a form of a salt or complex of the precious metal and/or alkaline-earth metal, the following problem will occur. That is, in this case, there is a possibility that the aggregation of the precious metal and/or alkaline-earth metal easily occurs in the step of drying the slurry, etc. due to the low thermal stability of the salt or complex.

As described above in detail, the alkaline-earth metal is distributed in the catalytic layer 20 with high uniformity. That is, in the catalytic layer 20, most part of the alkaline-earth metal is in contact with the precious metal. Thus, in this catalytic layer 20, HC poisoning of the precious metal by the alkaline-earth metal can be suppressed effectively. Therefore, the exhaust gas-purifying catalyst 1 can achieve an excellent performance in purifying exhaust gas.

The uniformity of the alkaline-earth metal distribution in the catalytic layer is evaluated as follows.

First, supposed are m planes that are obtained by dividing the region between the surface of the catalytic layer 20 and the interface of the catalytic layer 20 on the substrate 10 into 350 equal parts. Then, 350 intersection points of these 350 planes and a straight line that is perpendicular to the main surface of the catalytic layer 20 are supposed. Hereinafter, these 350 intersection points are referred to as points $P_i$ (i=1, 2, ..., 350).

Then, using an electron beam microanalyzer (EPMA), intensity $I_{Al,i}$ of the characteristic X-ray emitted by aluminum and intensity $I_{AE,i}$ of the characteristic X-ray emitted by the alkaline-earth metal element are measured on each of these 350 points $P_i$. Furthermore, the correlation coefficient $\rho_{Al,AE}$ given by the following formula (1) is obtained based on these measurement values.

$$\rho_{Al,AE} = \frac{C_{Al,AE}}{\sigma_{Al}\sigma_{AE}} \quad (1)$$

In the above formula (1), $C_{Al,AE}$ is a covariance of the intensity $I_{Al,i}$ and the intensity $I_{AE,i}$, $\sigma_{Al}$ is the standard deviation of the intensity $I_{Al,i}$, and $\sigma_{AE}$ is the standard deviation of the intensity $I_{AE,i}$. The covariance $C_{Al,AE}$ and the standard deviations $\sigma_{Al}$ and $\sigma_{AE}$ are given by the following formulae (2) to (4), respectively.

$$C_{Al,AE} = \frac{1}{350}\sum_{i=1}^{350}(I_{Al,i} - I_{Al,av})(I_{AE,i} - I_{AE,av}) \quad (2)$$

$$\sigma_{Al} = \sqrt{\frac{1}{350}\sum_{i=1}^{350}(I_{Al,i} - I_{Al,av})^2} \quad (3)$$

$$\sigma_{AE} = \sqrt{\frac{1}{350}\sum_{i=1}^{350}(I_{AE,i} - I_{AE,av})^2} \quad (4)$$

In each of the above formulae, $I_{Al,av}$ is the arithmetic average value of the intensity $I_{Al,i}$ given by the following formula (5), and $I_{AE,av}$ is the arithmetic average value of the intensity $I_{AE,i}$ given by the following formula (6).

$$I_{Al,av} = \frac{1}{350}\sum_{i=1}^{350} I_{Al,i} \quad (5)$$

$$I_{AE,av} = \frac{1}{350}\sum_{i=1}^{350} I_{AE,i} \quad (6)$$

The correlation coefficient $\rho_{Al,AE}$ represented by the above formula serves as an indicator that shows the correlation between the distribution of aluminum and the distribution of the alkaline-earth metal in the catalytic layer 20. That is, in the case where the alkaline-earth metal is distributed in the catalytic layer 20 with a relatively high uniformity, the correlation coefficient $\rho_{Al,AE}$ is a large positive value of 1 or less. On the other hand, in the case where the alkaline-earth metal is distributed in the catalytic layer 20 with a relatively low uniformity, the correlation coefficient $\rho_{Al,AE}$ is a small positive value close to 0.

Thus, by using the correlation coefficient $\rho_{Al,AE}$, the uniformity of the alkaline-earth metal distribution in the catalytic layer 20 can be evaluated. In the exhaust gas-purifying catalyst 1, the correlation coefficient $\rho_{Al,AE}$ of the catalytic layer 20 is a large positive value of 1 or less. That is, in the catalytic layer 20 of the exhaust gas-purifying catalyst 1, the alkaline-earth metal is distributed with a relatively high uniformity.

In the exhaust gas-purifying catalyst 1, the correlation coefficient $\rho_{Al,AE}$ of the catalytic layer 20 is preferably 0.60 or more, more preferably 0.70 or more, and most preferably 0.75 or more.

In the catalytic layer 20, the precious metal and the alkaline-earth metal are present close to each other. The proximity of the precious metal and the alkaline-earth metal in the catalytic layer 20 is evaluated as follows.

First, using an electron beam microanalyzer (EPMA), intensity $I_{PM,i}$ of the characteristic X-ray emitted by the precious metal and intensity $I_{AE,i}$ of the characteristic X-ray emitted by the alkaline-earth metal element are measured on each of the above-described 350 points $P_i$. Furthermore, the correlation coefficient $\rho_{PM,AE}$ given by the following formula (7) is obtained based on these measurement values.

$$\rho_{PM,AE} = \frac{C_{PM,AE}}{\sigma_{PM}\sigma_{AE}} \quad (7)$$

In the above formula (7), $C_{PM,AE}$ and $\sigma_{PM}$ are represented by the following formulae (8) and (9), respectively. Further, $\sigma_{AE}$ is represented by the above formula (4).

$$C_{PM,AE} = \frac{1}{350}\sum_{i=1}^{350}(I_{PM,i} - I_{PM,av})(I_{AE,i} - I_{AE,av}) \quad (8)$$

$$\sigma_{PM} = \sqrt{\frac{1}{350}\sum_{i=1}^{350}(I_{PM,i} - I_{PM,av})^2} \quad (9)$$

In each of the above formulae, $I_{PM,av}$ is the arithmetic average value of the intensity $I_{Al,i}$ given by the following formula (11), and $I_{AE,av}$ is the arithmetic average value of the intensity $I_{AE,i}$ given by the above formula (6).

$$I_{PM,av} = \frac{1}{350}\sum_{i=1}^{350} I_{PM,i} \quad (11)$$

The correlation coefficient $\rho_{PM,AE}$ thus obtained serves as an indicator that shows the correlation between the distribution of the precious metal and the distribution of the alkaline-earth metal in the catalytic layer 20. That is, in the case where the precious metal and the alkaline-earth metal are distributed close to each other in the catalytic layer 20, the correlation coefficient $\rho_{PM,AE}$ is a large positive value of 1 or less. On the other hand, in the case where the precious metal and the alkaline-earth metal are distributed not close to each other in the catalytic layer 20, the correlation coefficient $\rho_{PM,AE}$ is a small positive value close to 0.

Thus, by using the correlation coefficient $\rho_{PM,AE}$, the proximity of the precious metal and the alkaline-earth metal in the catalytic layer 20 can be evaluated. In the exhaust gas-purifying catalyst 1, the correlation coefficient $\rho_{PM,AE}$ of the catalytic layer 20 is a large positive value of 1 or less. That is, in the catalytic layer 20 of the exhaust gas-purifying catalyst 1, the precious metal and the alkaline-earth metal are distributed close to each other.

In the exhaust gas-purifying catalyst 1, the correlation coefficient $\rho_{PM,AE}$ of the catalytic layer 20 is preferably 0.51 or more, more preferably 0.60 or more, and most preferably 0.69 or more.

Figure 2:
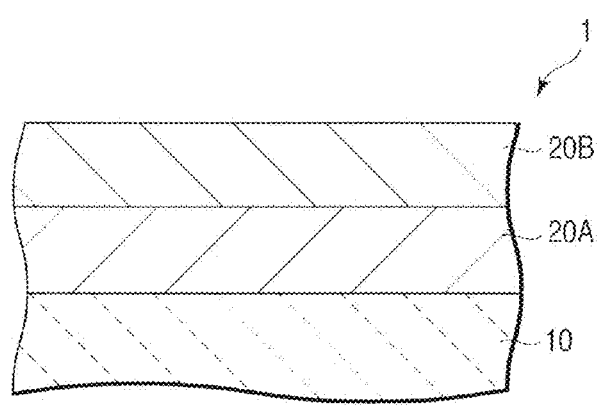
FIG. 2 is a cross-sectional view schematically showing an exhaust gas-purifying catalyst according to a second embodiment of the present invention.

FIG. 2 is a cross-sectional view schematically showing an exhaust gas-purifying catalyst according to a second embodiment of the present invention.

The exhaust gas-purifying catalyst 1 includes a substrate 10, a first catalytic layer 20A facing the substrate 10, and a second catalytic layer 20B facing the substrate 10 with the first catalytic layer 20A interposed therebetween. The first catalytic layer has the same composition as that of the catalytic layer 20 described with reference to FIG. 1. That is, the exhaust gas-purifying catalyst 1 has the same structure as that of the exhaust gas-purifying catalyst described with reference to FIG. 1 except that it further includes the second catalytic layer 20B.

The second catalytic layer 20B has a composition different from that of the first catalytic layer 20A.

Typically, the second catalytic layer 20B contains a precious metal. As the precious metal, typically used is a precious metal that is different from the precious metal contained in the first catalytic layer 20A. For example, in the case where the first catalytic layer 20A contains palladium and/or platinum as the precious metal, the second catalytic layer 20B typically contains rhodium. Alternatively, in the case where the first catalytic layer 20A contains rhodium as the precious metal, the second catalytic layer 20B typically contains palladium and/or platinum. When such a structure is employed, the performance of the exhaust gas-purifying catalyst 1 in purifying an exhaust gas can be further improved.

The second catalytic layer 20B may or may not contain an alkaline-earth metal. In the case where the second catalytic layer 20B contains an alkaline-earth metal, the alkaline-earth metal content of the second catalytic layer 20B is typically set as follows. That is, in the case where the second catalytic layer 20B contains rhodium, the alkaline-earth metal content of the second catalytic layer 20B is set smaller than the alkaline-earth metal content of the first catalytic layer 20A. In the case where the first catalytic layer 20A contains rhodium, the alkaline-earth metal content of the second catalytic layer 20B is set greater than the alkaline-earth metal content of the first catalytic layer 20A. The slurry used as the material of the second catalytic layer 20B may or may not contain citric acid.

Figure 3:
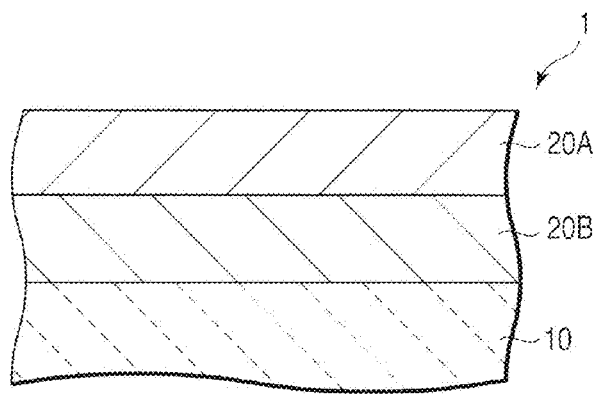
FIG. 3 is a cross-sectional view schematically showing an exhaust gas-purifying catalyst according to a third embodiment of the present invention.

FIG. 3 is a cross-sectional view schematically showing an exhaust gas-purifying catalyst according to a third embodiment of the present invention.

The exhaust gas-purifying catalyst 1 includes a substrate 10, a first catalytic layer 20A facing the substrate 10, and a second catalytic layer 20B interposed between the substrate 10 and the first catalytic layer 20A. That is, the exhaust gas-purifying catalyst 1 has the same structure as that of the exhaust gas-purifying catalyst described with reference to FIG. 2 except that the order in which the first catalytic layer 20A and the second catalytic layer 20B are stacked is reversed. Appropriately selecting a structure from the above-described structures can optimize the performance of the exhaust gas-purifying catalyst in purifying an exhaust gas.

As above, the exhaust gas-purifying catalyst 1 may further includes an additional catalytic layer above the catalytic layer 20 and/or between the catalytic layer 20 and the substrate 10.

The additional catalytic layer is formed, for example, using a slurry that does not satisfy the conditions for the slurry described as an example of a raw material of the catalytic layer 20. For example, the additional catalytic layer is formed using a slurry that does not contain an alkaline-earth metal. Alternatively, the additional catalytic layer is formed using a slurry that does not contain citric acid.

The additional catalytic layer may be formed using a slurry that satisfies the above-described conditions. In this case, for example, the catalytic layer 20 and the additional catalytic layer are made different from each other in at least one of selection or content of the precious metal, oxygen storage material or alkaline-earth metal and average particle diameter d of the sulfate of the alkaline-earth metal.

In the case where the structure described with reference to FIG. 2 or 3 is employed, the uniformity of the distribution of the alkaline-earth metal in each of the first catalytic layer 20A and the second catalytic layer 20B can be evaluated, for example, as follows. Here, an example will be described in which the catalytic layers 20A and 20B are arranged as shown in FIG. 2.

First, supposed are 175 planes that are obtained by dividing the region between the surface of the first catalytic layer 20A on the side of the second catalytic layer 20B and the surface of the first catalytic layer 20A on the side of the substrate 10 into 175 equal parts. Measurements using EPMA are performed on 175 intersection points $P_j$ (j=1, 2, ..., 175) of the 175 planes and a straight line perpendicular to the main surface of the first catalytic layer 20A. Then, the correlation coefficients $\rho_{Al,AE}$ and $\rho_{PM,AE}$ are calculated for the first catalytic layer 20A by the same methods as those described for the catalytic layer 20.

Next, supposed are 175 planes that are obtained by dividing the region between the surface of the second catalytic layer 20B and the other surface of the second catalytic layer 20B on the side of the first catalytic layer 20A into 175 equal parts. Measurements using EPMA are performed on 175 intersection points $P_k$ (k=1, 2, ..., 175) of the 175 planes and a straight line perpendicular to the main surface of the second catalytic layer 20B. Then, the correlation coefficients $\rho_{Al,AE}$ and $\rho_{PM,AE}$ are calculated for the second catalytic layer 20B by the same methods as those described for the catalytic layer 20.

In the exhaust gas-purifying catalysts 1 described with reference to FIGS. 2 and 3, at least the first catalytic layer 20A has the correlation coefficients $\rho_{Al,AE}$ and $\rho_{PM,AE}$ that are large positive values of 1 or less. The correlation coefficient $\rho_{Al,AE}$ of the first catalytic layer 20A is preferably 0.60 or more, more preferably 0.70 or more, and most preferably 0.75 or more. The correlation coefficient $\rho_{PM,AE}$ of the first catalytic layer 20A is preferably 0.51 or more, more preferably 0.60 or more, and most preferably 0.69 or more.

EXAMPLES

Example 1

Manufacture of Catalyst C1

A composite oxide of cerium oxide and zirconium oxide was prepared. The composite oxide had a molar ratio of cerium to zirconium of 7/3. Hereinafter, the composite oxide is referred to as "CZ oxide".

Barium sulfate having an average particle diameter d=0.05 μm was then prepared. Hereinafter, the barium sulfate is referred to as "barium sulfate BS1".

Aqueous palladium nitrate containing 1 g of Pd, 90 g of alumina, 100 g of CZ oxide, 17 g of barium sulfate BS1, and 10 g of citric acid were mixed together to prepare a slurry. Hereinafter, the slurry is referred to as "slurry S1".

A substrate was coated with the slurry S1. Here, used as the substrate was a monolith honeycomb substrate made of cordierite and having a total length of 100 mm, a volumetric capacity of 1 L and a cell number of 900 cells per square inch (1 inch=2.54 cm).

After drying the resultant structure at 250° C. for 1 hour, it was fired at 500° C. for 1 hour. Thus, a catalytic layer was formed on the substrate using the above-described slurry S1 as a raw material.

An exhaust gas-purifying catalyst was thus manufactured. Hereinafter, the catalyst is referred to as "catalyst C1".

Example 2

Manufacture of Catalyst C2

Barium sulfate having an average particle diameter d=0.15 μm was prepared. Hereinafter, the barium sulfate is referred to as "barium sulfate BS2".

An exhaust gas-purifying catalyst was manufactured by the same method as that described for the catalyst C1 except that barium sulfate BS2 was used instead of barium sulfate BS1. Hereinafter, the catalyst is referred to as "catalyst C2".

Example 3

Manufacture of catalyst C3

Barium sulfate having an average particle diameter d=0.70 μm was prepared. Hereinafter, the barium sulfate is referred to as "barium sulfate BS3".

An exhaust gas-purifying catalyst was manufactured by the same method as that described for the catalyst C1 except that barium sulfate BS3 was used instead of barium sulfate BS1. Hereinafter, the catalyst is referred to as "catalyst C3".

Example 4

Manufacture of Catalyst C4

Barium sulfate having an average particle diameter d=0.01 μm was prepared. Hereinafter, the barium sulfate is referred to as "barium sulfate BS4".

An exhaust gas-purifying catalyst was manufactured by the same method as that described for the catalyst C1 except that barium sulfate BS4 was used instead of barium sulfate BS1. Hereinafter, the catalyst is referred to as "catalyst C4".

Example 5

Manufacture of Catalyst C5

An exhaust gas-purifying catalyst was manufactured by the same method as that described for the catalyst C1 except that aqueous dinitrodiamine platinum nitrate containing 1 g of Pt was used instead of aqueous palladium nitrate containing 1 g of palladium. Hereinafter, the catalyst is referred to as "catalyst C5".

Example 6

Manufacture of Catalyst C6

An exhaust gas-purifying catalyst was manufactured by the same method as that described for the catalyst C1 except that aqueous palladium nitrate containing 0.5 g of palladium and aqueous dinitrodiamine platinum nitrate containing 0.5 g of Pt were used instead of aqueous palladium nitrate containing 1 g of palladium. Hereinafter, the catalyst is referred to as "catalyst C6".

Example 7

Manufacture of Catalyst C7

Strontium sulfate having an average particle diameter d=0.05 μm was prepared. Hereinafter, the strontium sulfate is referred to as "strontium sulfate SS1".

An exhaust gas-purifying catalyst was manufactured by the same method as that described for the catalyst C1 except that 21 g of strontium sulfate SS1 was used instead of 17 g of barium sulfate BS1. Hereinafter, the catalyst is referred to as "catalyst C7".

Example 8

Manufacture of Catalyst C8

Calcium sulfate having an average particle diameter d=0.05 μm was prepared. Hereinafter, the calcium sulfate is referred to as "calcium sulfate CS".

An exhaust gas-purifying catalyst was manufactured by the same method as that described for the catalyst C1 except that 34 g of calcium sulfate CS was used instead of 17 g of barium sulfate BS1. Hereinafter, the catalyst is referred to as "catalyst C8".

Example 9

Manufacture of Catalyst C9

A composite oxide of cerium oxide, zirconium oxide, lanthanum oxide and praseodymium oxide was prepared. The composite oxide contained cerium, zirconium, lanthanum and praseodymium in a molar proportion of 6:2:1:1. Hereinafter, the composite oxide is referred to as "CZLP oxide".

An exhaust gas-purifying catalyst was manufactured by the same method as that described for the catalyst C1 except that CZLP oxide was used instead of CZ oxide. Hereinafter, the catalyst is referred to as "catalyst C9".

Example 10

Manufacture of Catalyst C10

An exhaust gas-purifying catalyst was manufactured by the same method as that described for the catalyst C1 except that 99.9 g of alumina was used instead of 90 g of alumina and 0.17 g of barium sulfate BS1 was used instead of 17 g of barium sulfate BS1. Hereinafter, the catalyst is referred to as "catalyst C10".

Example 11

Manufacture of Catalyst C11

An exhaust gas-purifying catalyst was manufactured by the same method as that described for the catalyst C1 except that 220 g of alumina was used instead of 90 g of alumina, 136 g of barium sulfate BS1 was used instead of 17 g of barium sulfate BS1, and 20 g of citric acid was used instead of 10 g of citric acid. Hereinafter, the catalyst is referred to as "catalyst C11".

Example 12

Manufacture of Catalyst C12

An exhaust gas-purifying catalyst was manufactured by the same method as that described for the catalyst C1 except that 99.95 g of alumina was used instead of 90 g of alumina and 0.08 g of barium sulfate BS1 was used instead of 17 g of barium sulfate BS1. Hereinafter, the catalyst is referred to as "catalyst C12".

Example 13

Manufacture of Catalyst C13

An exhaust gas-purifying catalyst was manufactured by the same method as that described for the catalyst C1 except that 216 g of alumina was used instead of 90 g of alumina, 142.8 g of barium sulfate BS1 was used instead of 17 g of barium sulfate BS1, and 20 g of citric acid was used instead of 10 g of citric acid. Hereinafter, the catalyst is referred to as "catalyst C13".

Example 14

Manufacture of Catalyst C14

The exhaust gas-purifying catalyst described with reference to FIG. 2 was manufactured as follows.

Aqueous palladium nitrate containing 0.5 g of Pd, 45 g of alumina, 50 g of CZ oxide, 8.5 g of barium sulfate BS1, and 5 g of citric acid were mixed together to prepare a slurry. Hereinafter, the slurry is referred to as "slurry S2".

The same substrate as that used in Example 1 was coated with the slurry S2. After drying the resultant structure at 250° C. for 1 hour, it was fired at 500° C. for 1 hour. Thus, a lower layer was formed on the substrate using the above-described slurry S1 as a raw material.

Then, a composite oxide of zirconium oxide and cerium oxide was prepared. The composite oxide had a molar ratio of cerium to zirconium of 3/7. Hereinafter, the composite oxide is referred to as "ZC oxide".

Aqueous rhodium nitrate containing 0.5 g of Rh, 50 g of alumina, and 50 g of ZC oxide were mixed together to prepare a slurry. Hereinafter, the slurry is referred to as "slurry S3".

Subsequently, the lower layer was coated with the slurry S3. After drying the resultant structure at 250° C. for 1 hour, it was fired at 500° C. for 1 hour. Thus, an upper layer was formed on the lower layer using the slurry S3 as a raw material.

An exhaust gas-purifying catalyst was thus manufactured. Hereinafter, the catalyst is referred to as "catalyst C14".

Example 15

Manufacture of Catalyst C15

The exhaust gas-purifying catalyst described with reference to FIG. 3 was manufactured as follows.

A slurry was prepared by the same method as that described for the slurry S3 except that 49 g of alumina was used instead of 50 g of alumina and it was further added with 1.7 g of barium sulfate BS1 and 5 g of citric acid. Hereinafter, the slurry is referred to as "slurry S4".

An exhaust gas-purifying catalyst was manufactured by the same method as that described for the catalyst C14 except that the slurry S4 was used as the raw material of the lower layer instead of using the slurry S2 and the slurry S2 was used as the raw material of the upper layer instead of using the slurry S3. Hereinafter, the catalyst is referred to as "catalyst C15".

Example 16

Manufacture of Catalyst C16

The exhaust gas-purifying catalyst described with reference to FIG. 2 was manufactured as follows.

A slurry was prepared by the same method as that described for the slurry S2 except that aqueous palladium nitrate containing 0.25 g of Pd and aqueous dinitrodiamine platinum nitrate containing 0.25 g of Pt were used instead of aqueous palladium nitrate containing 0.5 g of Pd. Hereinafter, the slurry is referred to as "slurry S5".

An exhaust gas-purifying catalyst was manufactured by the same method as that described for the catalyst C14 except that the slurry S5 was used as the raw material of the lower layer instead of using the slurry S2 and the slurry S4 was used as the raw material of the upper layer instead of using the slurry S3. Hereinafter, the catalyst is referred to as "catalyst C16".

Example 17

Manufacture of Catalyst C17

The exhaust gas-purifying catalyst described with reference to FIG. 3 was manufactured as follows.

That is, an exhaust gas-purifying catalyst was manufactured by the same method as that described for the catalyst C16 except that the slurry S4 was used as the raw material of the lower layer instead of using the slurry S5 and the slurry S5 was used as the raw material of the upper layer instead of using the slurry S4. Hereinafter, the catalyst is referred to as "catalyst C17".

Example 18

Manufacture of Catalyst C18

An exhaust gas-purifying catalyst was manufactured by the same method as that described for the catalyst C1 except that aqueous rhodium nitrate containing 1 g of Rh was used instead of aqueous palladium nitrate containing 1 g of Pd. Hereinafter, the catalyst is referred to as "catalyst C18".

Example 19

Manufacture of Catalyst C19 (Comparative Example)

Barium sulfate having an average particle diameter d=0.75 μm was prepared. Hereinafter, the barium sulfate is referred to as "barium sulfate BS5".

An exhaust gas-purifying catalyst was manufactured by the same method as that described for the catalyst C1 except that barium sulfate BS5 was used instead of barium sulfate BS1. Hereinafter, the catalyst is referred to as "catalyst C19".

Example 20

Manufacture of Catalyst C20 (Comparative Example)

Barium sulfate having an average particle diameter d=0.005 μm was prepared. Hereinafter, the barium sulfate is referred to as "barium sulfate BS6".

An exhaust gas-purifying catalyst was manufactured by the same method as that described for the catalyst C1 except that barium sulfate BS6 was used instead of barium sulfate BS1. Hereinafter, the catalyst is referred to as "catalyst C20".

Example 21

Manufacture of Catalyst C21 (Comparative Example)

An exhaust gas-purifying catalyst was manufactured by the same method as that described for the catalyst C5 except that barium sulfate BS5 was used instead of barium sulfate BS1. Hereinafter, the catalyst is referred to as "catalyst C21".

Example 22

Manufacture of Catalyst C22 (Comparative Example)

Strontium sulfate having an average particle diameter d=0.75 μm was prepared. Hereinafter, the strontium sulfate is referred to as "strontium sulfate SS2".

An exhaust gas-purifying catalyst was manufactured by the same method as that described for the catalyst C7 except that strontium sulfate SS2 was used instead of strontium sulfate SS1. Hereinafter, the catalyst is referred to as "catalyst C22".

Example 23

Manufacture of Catalyst C23 (Comparative Example)

An exhaust gas-purifying catalyst was manufactured by the same method as that described for the catalyst C12 except that barium sulfate BS5 was used instead of barium sulfate BS1. Hereinafter, the catalyst is referred to as "catalyst C23".

Example 24

Manufacture of Catalyst C24 (Comparative Example)

An exhaust gas-purifying catalyst was manufactured by the same method as that described for the catalyst C14 except that barium sulfate BS5 was used instead of barium sulfate BS1. Hereinafter, the catalyst is referred to as "catalyst C24".

Example 25

Manufacture of Catalyst C25 (Comparative Example)

Barium carbonate having an average particle diameter d=0.05 µm was prepared. Hereinafter, the barium carbonate is referred to as "barium carbonate BC".

An exhaust gas-purifying catalyst was manufactured by the same method as that described for the catalyst C1 except that 14.4 g of barium carbonate BC was used instead of 17 g of barium sulfate BS1. Hereinafter, the catalyst is referred to as "catalyst C25".

Example 26

Manufacture of Catalyst C26 (Comparative Example)

A slurry was prepared by the same method as that described for the slurry S1 except that citric acid was omitted. Hereinafter, the slurry is referred to as "slurry S6".

An exhaust gas-purifying catalyst was manufactured by the same method as that described for the catalyst C1 except that the slurry S6 was used instead of the slurry S1. Hereinafter, the catalyst is referred to as "catalyst C26".

Example 27

Manufacture of Catalyst C27 (Comparative Example)

An exhaust gas-purifying catalyst was manufactured by the same method as that described for the catalyst C19 except that aqueous rhodium nitrate containing 1 g of Rh was used instead of aqueous palladium nitrate containing 1 g of Pd. Hereinafter, the catalyst is referred to as "catalyst C27".

Example 28

Manufacture of Catalyst C28

Barium sulfate having an average particle diameter d=0.30 µm was prepared. Hereinafter, the barium sulfate is referred to as "barium sulfate BS7".

An exhaust gas-purifying catalyst was manufactured by the same method as that described for the catalyst C1 except that barium sulfate BS7 was used instead of barium sulfate BS1. Hereinafter, the catalyst is referred to as "catalyst C28".

Example 29

Manufacture of Catalyst C29

Barium sulfate having an average particle diameter d=0.40 µm was prepared. Hereinafter, the barium sulfate is referred to as "barium sulfate BS8".

An exhaust gas-purifying catalyst was manufactured by the same method as that described for the catalyst C1 except that barium sulfate BS8 was used instead of barium sulfate BS1. Hereinafter, the catalyst is referred to as "catalyst C29".

Example 30

Manufacture of Catalyst C30

Barium sulfate having an average particle diameter d=0.55 µm was prepared. Hereinafter, the barium sulfate is referred to as "barium sulfate BS9".

An exhaust gas-purifying catalyst was manufactured by the same method as that described for the catalyst C1 except that barium sulfate BS9 was used instead of barium sulfate BS1. Hereinafter, the catalyst is referred to as "catalyst C30".

The data for the catalysts C1 to C30 are summarized in TABLES 1 to 4 below.

TABLE 1

| Catalyst | Salt of alkaline-earth metal | Average particle diameter d (µm) | Average particle diameter d' (µm) | Amount of alkaline-earth metal (g/L) | Precious metal | Amount of precious metal (g/L) | Correlation coefficient ρAl, AE | Correlation coefficient ρPM, AE | Emission NMHC (g/km) | Emission CO (g/km) | Emission $NO_x$ (g/km) |
|---|---|---|---|---|---|---|---|---|---|---|---|
| C1 | Ba sulfate | 0.05 | 0.05 | 10 | Pd | 1 | 0.89 | 0.80 | 0.012 | 0.116 | 0.016 |
| C2 | Ba sulfate | 0.15 | 0.15 | 10 | Pd | 1 | 0.82 | 0.73 | 0.014 | 0.117 | 0.016 |
| C3 | Ba sulfate | 0.70 | 0.70 | 10 | Pd | 1 | 0.71 | 0.67 | 0.017 | 0.136 | 0.028 |
| C4 | Ba sulfate | 0.01 | 0.01 | 10 | Pd | 1 | 0.90 | 0.81 | 0.017 | 0.135 | 0.027 |
| C5 | Ba sulfate | 0.05 | 0.05 | 10 | Pt | 1 | 0.88 | 0.80 | 0.018 | 0.155 | 0.037 |
| C6 | Ba sulfate | 0.05 | 0.05 | 10 | Pd Pt | 0.5 0.5 | 0.89 | 0.81 | 0.015 | 0.112 | 0.015 |
| C7 | Sr sulfate | 0.05 | 0.05 | 10 | Pd | 1 | 0.87 | 0.79 | 0.012 | 0.118 | 0.016 |
| C8 | Ca sulfate | 0.05 | 0.05 | 10 | Pd | 1 | 0.87 | 0.79 | 0.015 | 0.120 | 0.018 |

TABLE 1-continued

| Catalyst | Salt of alkaline-earth metal | Average particle diameter d (μm) | Average particle diameter d' (μm) | Amount of alkaline-earth metal (g/L) | Precious metal | Amount of precious metal (g/L) | Correlation coefficient ρAl, AE | Correlation coefficient ρPM, AE | Emission NMHC (g/km) | Emission CO (g/km) | Emission NOx (g/km) |
|---|---|---|---|---|---|---|---|---|---|---|---|
| C9 | Ba sulfate | 0.05 | 0.05 | 10 | Pd | 1 | 0.89 | 0.80 | 0.006 | 0.109 | 0.009 |
| C10 | Ba sulfate | 0.05 | 0.05 | 0.1 | Pd | 1 | 0.87 | 0.80 | 0.015 | 0.125 | 0.021 |
| C11 | Ba sulfate | 0.05 | 0.05 | 80 | Pd | 1 | 0.83 | 0.73 | 0.014 | 0.126 | 0.027 |

TABLE 2

| Catalyst | Catalytic layer | Salt of alkaline-earth metal | Average particle diameter d (μm) | Average particle diameter d' (μm) | Amount of alkaline-earth metal (g/L) | Precious metal | Amount of precious metal (g/L) |
|---|---|---|---|---|---|---|---|
| C12 | | Ba sulfate | 0.05 | 0.05 | 0.05 | Pd | 1 |
| C13 | | Ba sulfate | 0.05 | 0.05 | 84 | Pd | 1 |
| C14 | Upper layer | | | | 0 | Rh | 0.5 |
| | Lower layer | Ba sulfate | 0.05 | 0.05 | 5 | Pd | 0.5 |
| C15 | Upper layer | Ba sulfate | 0.05 | 0.05 | 5 | Pd | 0.5 |
| | Lower layer | Ba sulfate | 0.05 | 0.05 | 1 | Rh | 0.5 |
| C16 | Upper layer | Ba sulfate | 0.05 | 0.05 | 1 | Rh | 0.5 |
| | Lower layer | Ba sulfate | 0.05 | 0.05 | 5 | Pd | 0.25 |
| | | | | | | Pt | 0.25 |
| C17 | Upper layer | Ba sulfate | 0.05 | 0.05 | 5 | Pd | 0.25 |
| | | | | | | Pt | 0.25 |
| | Lower layer | Ba sulfate | 0.05 | 0.05 | 1 | Rh | 0.5 |
| C18 | | Ba sulfate | 0.05 | 0.05 | 10 | Rh | 1 |

| Catalyst | Correlation coefficient ρAl, AE | Correlation coefficient ρPM, AE | Emission NMHC (g/km) | Emission CO (g/km) | Emission NOx (g/km) |
|---|---|---|---|---|---|
| C12 | 0.85 | 0.76 | 0.023 | 0.136 | 0.033 |
| C13 | 0.80 | 0.70 | 0.023 | 0.139 | 0.039 |
| C14 | | | 0.016 | 0.097 | 0.007 |
| | 0.89 | 0.81 | | | |
| C15 | 0.89 | 0.80 | 0.003 | 0.054 | 0.002 |
| | 0.88 | 0.80 | | | |
| C16 | 0.87 | 0.80 | 0.018 | 0.094 | 0.007 |
| | 0.88 | 0.81 | | | |
| C17 | 0.89 | 0.80 | 0.017 | 0.096 | 0.008 |
| | 0.88 | 0.79 | | | |
| C18 | 0.89 | 0.80 | 0.006 | 0.059 | 0.007 |

TABLE 3

| Catalyst | Catalytic layer | Salt of alkaline-earth metal | Average particle diameter d (μm) | Average particle diameter d' (μm) | Amount of alkaline-earth metal (g/L) | Precious metal | Amount of precious metal (g/L) |
|---|---|---|---|---|---|---|---|
| C19 | | Ba sulfate | 0.75 | 0.75 | 10 | Pd | 1 |
| C20 | | Ba sulfate | 0.005 | 0.005 | 10 | Pd | 1 |
| C21 | | Ba sulfate | 0.75 | 0.75 | 10 | Pt | 1 |
| C22 | | Sr sulfate | 0.75 | 0.75 | 10 | Pd | 1 |
| C23 | | Ba sulfate | 0.75 | 0.75 | 0.05 | Pd | 1 |
| C24 | Upper layer | | | | | Rh | 0.5 |
| | Lower layer | Ba sulfate | 0.75 | 0.75 | 5 | Pd | 0.5 |
| C25 | | Ba carbonate | 0.05 | 1.20 | 10 | Pd | 1 |
| C26 | | Ba sulfate | 0.05 | 0.05 | 10 | Pd | 1 |
| C27 | | Ba sulfate | 0.75 | 0.75 | 10 | Rh | 1 |

TABLE 3-continued

| Catalyst | Correlation coefficient ρAI, AE | Correlation coefficient ρPM, AE | Emission NMHC (g/km) | CO (g/km) | NO$_x$ (g/km) |
|---|---|---|---|---|---|
| C19 | 0.59 | 0.50 | 0.031 | 0.170 | 0.045 |
| C20 | 0.85 | 0.76 | 0.029 | 0.169 | 0.044 |
| C21 | 0.58 | 0.50 | 0.037 | 0.202 | 0.069 |
| C22 | 0.59 | 0.49 | 0.031 | 0.171 | 0.046 |
| C23 | 0.54 | 0.46 | 0.045 | 0.187 | 0.065 |
| C24 |  |  | 0.038 | 0.150 | 0.038 |
|  | 0.59 | 0.50 |  |  |  |
| C25 | 0.53 | 0.45 | 0.027 | 0.168 | 0.043 |
| C26 | 0.61 | 0.52 | 0.030 | 0.173 | 0.047 |
| C27 | 0.58 | 0.50 | 0.021 | 0.099 | 0.032 |

TABLE 4

| Catalyst | Salt of alkaline-earth metal | Average particle diameter d (μm) | Average particle diameter d' (μm) | Amount of alkaline-earth metal (g/L) | Precious metal | Amount of precious metal (g/L) | Correlation coefficient ρAI, AE | Correlation coefficient ρPM, AE | Emission NMHC (g/km) | CO (g/km) | NO$_x$ (g/km) |
|---|---|---|---|---|---|---|---|---|---|---|---|
| C28 | Ba sulfate | 0.30 | 0.30 | 10 | Pd | 1 | 0.78 | 0.70 | 0.015 | 0.122 | 0.018 |
| C29 | Ba sulfate | 0.40 | 0.40 | 10 | Pd | 1 | 0.77 | 0.70 | 0.015 | 0.124 | 0.020 |
| C30 | Ba sulfate | 0.55 | 0.55 | 10 | Pd | 1 | 0.74 | 0.68 | 0.017 | 0.128 | 0.025 |

<SEM Observation>

For each of the catalysts C2 and C19, the surface of the catalytic layer was observed using a field emission SEM (FE-SEM) at a 50,000-fold magnification. FIGS. 4 and 5 show the results.

FIG. 4 is a SEM photograph of the surface of the catalytic layer of the catalyst according to Example 2. FIG. 5 is a SEM photograph of the surface of the catalytic layer of the catalyst according to Example 19.

As will be apparent from the SEM photographs, it was established that fine particles of barium sulfate was uniformly distributed in the catalyst C2. By contras, it was established that coarse particles of barium sulfate was nonuniformly distributed in the catalyst C19.

<Average Particle Diameter d'>

For each of the catalysts C1 to C30, an average particle diameter d' of the alkaline-earth metal salt was measured by the above-described method. The results are summarized in TABLES 1 to 4 above.

As shown in TABLES 1 to 4, in the catalysts C1 to C24 and C26 to C30, the average particle diameter d' was equal to the average particle diameter d. By contrast, in the catalyst C25, the average particle diameter d' was mach greater than the average particle diameter d. In this regard, the present inventors consider as follows. That is, in the case of using barium carbonate as the raw material, barium carbonate is dissolved in the slurry. Thus, aggregation of them is prone to occur in the step of drying the slurry. As a result, the average particle diameter d' is much greater than the average particle diameter d.

<Evaluation of Degree of Dispersion of Alkaline-Earth Metal in Catalytic Layer>

For each of the catalysts C1 to C30, the correlation coefficient $\rho_{Al,AE}$ was calculated by the above-described method. The results are summarized in TABLES 1 to 4 above <Evaluation of Proximity of Precious Metal and Alkaline-Earth Metal in Catalytic Layer>

For each of the catalysts C1 to C30, the correlation coefficient $\rho_{PM,AE}$ was calculated by the above-described method. The results are summarized in TABLES 1 to 4 above <Evaluation of Exhaust Gas Purification Performance>

For each of the catalysts C1 to C30, the exhaust gas-purifying performance was evaluated.

First, an endurance test corresponding to driving of 60,000 km was performed for each of the catalysts C1 to C30. Then, each of them was mounted on an actual vehicle having an engine with a piston displacement of 1.0 L. Subsequently, the actual vehicle was driven on JC08C mode (JC08 mode by cold start) and JC08H mode (JC08 mode by hot start), and the emissions of non-methane hydrocarbons (NMHC), CO and NO$_x$ were measured in each mode. Then, the emissions obtained in each mode were substituted into the following formula, and a combined value of the emissions of NMHC, CO and NO$_x$ by JC08 mode was obtained.

$$E = 0.25 \times E_C + 0.75 \times E_H$$

In the formula, E is the combined value of the emissions of the exhaust gases by JC08 mode, $E_C$ is the measurement value of the emission of the exhaust gas by JC08C mode, $E_H$ is the measurement value of the emission of the exhaust gas by JC08H mode. The combined values of the emissions of the respective exhaust gases obtained as above are summarized in TABLES 1 to 4 above.

Figure 6:
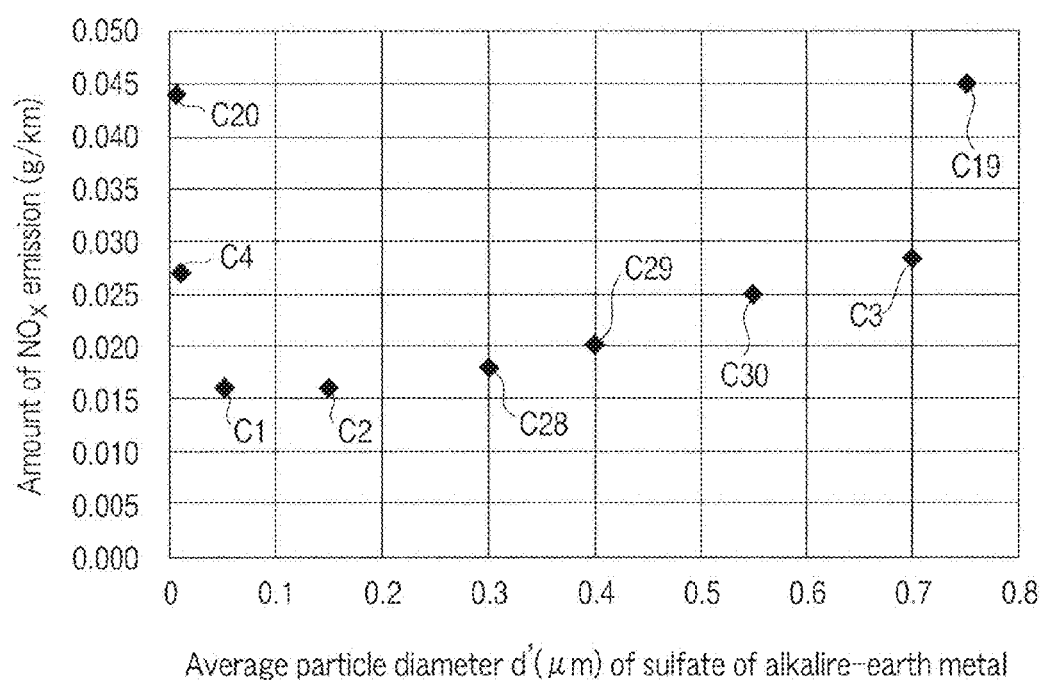
FIG. 6 is a graph showing an example of the relationship between the average particle diameter d' of a sulfate of an alkaline-earth metal and an $NO_x$ emission.

FIG. 6 is a graph showing an example of the relationship between the average particle diameter d' of a sulfate of an alkaline-earth metal and an NO$_x$ emission. FIG. 6 shows a plot of data for the catalyst C1 to C4, C19, C20 and C28 to C30.

As will be apparent from FIG. 6, when the average particle diameter d' of alkaline-earth metal sulfate was set within a range of 0.01 to 0.70 μm, an excellent NO$_x$-purifying performance could be achieved. When the average particle diameter d' of alkaline-earth metal sulfate was set within a range of 0.05 to 0.40 µm, a higher $NO_x$-purifying performance could be achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An exhaust gas-purifying catalyst comprising:
a substrate; and
a catalytic layer facing the substrate and including a precious metal, alumina, an oxygen storage material, and a sulfate of an alkaline-earth metal having an average particle diameter falling within a range of 0.01 to 0.70 µm, the average particle diameter being obtained by observation using a scanning electron microscope,
wherein the oxygen storage material is a composite oxide containing cerium and zirconium; and
the catalytic layer having a correlation coefficient $\rho_{PM,AE}$ of 0.60 or more, the coefficient $\rho_{PM,AE}$ being expressed by the following formula (7):

$$\rho_{PM,AE} = \frac{C_{PM,AE}}{\sigma_{PM}\sigma_{AE}} \tag{7}$$

wherein $C_{PM,AE}$, $\sigma_{PM}$ and $\sigma_{AE}$ in the formula (7) are represented by the following formulae (8), (9) and (10), respectively:

$$C_{PM,AE} = \frac{1}{350}\sum_{i=1}^{350}(I_{PM,i} - I_{PM,av})(I_{AE,i} - I_{AE,av}) \tag{8}$$

$$\sigma_{PM} = \sqrt{\frac{1}{350}\sum_{i=1}^{350}(I_{PM,i} - I_{PM,av})^2} \tag{9}$$

$$\sigma_{AE} = \sqrt{\frac{1}{350}\sum_{i=1}^{350}(I_{AE,i} - I_{AE,av})^2} \tag{10}$$

in the formulae (8) to (10),
i is a natural number of 1 to 350,
$I_{PM,i}$ is intensity of characteristic X-ray emitted by the precious metal measured using an electron beam microanalyzer on the i-th intersection point among 350 intersection points of faces that are obtained by dividing the catalytic layer into 350 equal parts arranged in the thickness direction with a line that is perpendicular to a main surface of the catalytic layer,
$I_{PM,av}$ is an arithmetic average value of the $I_{PM,i}$ given by the following formula (11):

$$I_{PM,av} = \frac{1}{350}\sum_{i=1}^{350} I_{PM,i} \tag{11}$$

$I_{AE,i}$ is intensity of characteristic X-ray emitted the alkaline-earth metal element that is measured using the electron beam microanalyzer at the i-th intersection point, and $I_{AE,av}$ is an arithmetic average value of the $I_{AE,i}$ given by the following formula (12):

$$I_{AE,av} = \frac{1}{350}\sum_{i=1}^{350} I_{AE,i} \tag{12}$$

2. The exhaust gas-purifying catalyst according to claim 1, wherein the average particle diameter falls within a range of 0.05 to 0.40 µm.

3. The exhaust gas-purifying catalyst according to claim 1, wherein the catalytic layer has a correlation coefficient $\rho_{Al,AE}$ of 0.60 or more, the coefficient $\rho_{Al,AE}$ being expressed by the following formula (1):

$$\rho_{Al,AE} = \frac{C_{Al,AE}}{\sigma_{Al}\sigma_{AE}} \tag{1}$$

wherein $C_{Al,AE}$, $\sigma_{Al}$ and $\sigma_{AE}$ in the formula (1) are represented by the following formulae (2), (3) and (4), respectively:

$$C_{Al,AE} = \frac{1}{350}\sum_{i=1}^{350}(I_{Al,i} - I_{Al,av})(I_{AE,i} - I_{AE,av}) \tag{2}$$

$$\sigma_{Al} = \sqrt{\frac{1}{350}\sum_{i=1}^{350}(I_{Al,i} - I_{Al,av})^2} \tag{3}$$

$$\sigma_{AE} = \sqrt{\frac{1}{350}\sum_{i=1}^{350}(I_{AE,i} - I_{AE,av})^2} \tag{4}$$

in the formulae (2) to (4),
i is a natural number of 1 to 350,
$I_{Al,i}$ is intensity of characteristic X-ray emitted by aluminum measured using an electron beam microanalyzer on the i-th intersection point among 350 intersection points of planes and a line perpendicular to a main surface of the catalytic layer, the planes being obtained by dividing the catalytic layer into 350 equal parts arranged in the thickness direction,
$I_{Al,av}$ is an arithmetic average value of the $I_{Al,i}$ given by the following formula (5):

$$I_{Al,av} = \frac{1}{350}\sum_{i=1}^{350} I_{Al,i} \tag{5}$$

$I_{AE,i}$ is intensity of characteristic X-ray emitted by the alkaline-earth metal element that is measured using the electron beam microanalyzer at the i-th intersection point, and
$I_{AE,av}$ is an arithmetic average value of the $I_{AE,i}$ given by the following formula (6):

$$I_{AE,av} = \frac{1}{350}\sum_{i=1}^{350} I_{AE,i} \tag{6}$$

4. The exhaust gas-purifying catalyst according to claim 1, wherein the alkaline earth metal is barium.

5. The exhaust gas-purifying catalyst according to claim 1, wherein the precious metal is at least one selected from the group consisting of palladium, platinum, rhodium, and a combination of two or more of them.

6. An exhaust gas-purifying catalyst comprising:
a substrate; and
a catalytic layer formed on the substrate using slurry containing a precious metal, alumina, an oxygen storage material, and a sulfate of an alkaline-earth metal having an average particle diameter falling within a range of 0.01 to 0.70 μm, the average particle diameter being obtained by observation using a scanning electron microscope, the catalytic layer having a correlation coefficient $\rho_{PM,AE}$ of 0.60 or more, the coefficient $\rho_{PM,AE}$ being expressed by the following formula (7):

$$\rho_{PM,AE} = \frac{C_{PM,AE}}{\sigma_{PM}\sigma_{AE}} \quad (7)$$

wherein $C_{PM,AE}$, $\sigma_{PM}$ and $\sigma_{AE}$ in the formula (7) are represented by the following formulae (8), (9) and (10), respectively:

$$C_{PM,AE} = \frac{1}{350}\sum_{i=1}^{350}(I_{PM,i} - I_{PM,av})(I_{AE,i} - I_{AE,av}) \quad (8)$$

$$\sigma_{PM} = \sqrt{\frac{1}{350}\sum_{i=1}^{350}(I_{PM,i} - I_{PM,av})^2} \quad (9)$$

$$\sigma_{AE} = \sqrt{\frac{1}{350}\sum_{i=1}^{350}(I_{AE,i} - I_{AE,av})^2} \quad (10)$$

in the formulae (8) to (10),
i is a natural number of 1 to 350,
$I_{PM,i}$ is intensity of characteristic X-ray emitted by the precious metal measured using an electron beam microanalyzer on the i-th intersection point among 350 intersection points of faces that are obtained by dividing the catalytic layer into 350 equal parts arranged in the thickness direction with a line that is perpendicular to a main surface of the catalytic layer,
$I_{PM,av}$ is an arithmetic average value of the $I_{PM,i}$ given by the following formula (11):

$$I_{PM,av} = \frac{1}{350}\sum_{i=1}^{350} I_{PM,i} \quad (11)$$

$I_{AE,i}$ is intensity of characteristic X-ray emitted the alkaline-earth metal element that is measured using the electron beam microanalyzer at the i-th intersection point, and
$I_{AE,av}$ is an arithmetic average value of the $I_{AE,i}$ given by the following formula (12):

$$I_{AE,av} = \frac{1}{350}\sum_{i=1}^{350} I_{AE,i} \quad (12)$$

7. The exhaust gas-purifying catalyst according to claim 6, wherein the slurry further contains citric acid.

8. The exhaust gas-purifying catalyst according to claim 6, wherein the alkaline-earth metal is barium.

9. An exhaust gas-purifying catalyst comprising:
a substrate; and
a catalytic layer facing the substrate and including a precious metal, alumina, an oxygen storage material, and a sulfate of an alkaline-earth metal having an average particle diameter falling within a range of 0.01 to 0.70 μm, the average particle diameter being obtained by observation using a scanning electron microscope, the catalytic layer having a correlation coefficient $\rho_{Al,AE}$ of 0.60 or more, the coefficient $\rho_{Al,AE}$ being expressed by the following formula (1):

$$\rho_{Al,AE} = \frac{C_{Al,AE}}{\sigma_{Al}\sigma_{AE}} \quad (1)$$

wherein $C_{Al,AE}$, $\sigma_{Al}$ and $\sigma_{AE}$ in the formula (1) are represented by the following formulae (2), (3) and (4), respectively:

$$C_{Al,AE} = \frac{1}{350}\sum_{i=1}^{350}(I_{Al,i} - I_{Al,av})(I_{AE,i} - I_{AE,av}) \quad (2)$$

$$\sigma_{Al} = \sqrt{\frac{1}{350}\sum_{i=1}^{350}(I_{Al,i} - I_{Al,av})^2} \quad (3)$$

$$\sigma_{AE} = \sqrt{\frac{1}{350}\sum_{i=1}^{350}(I_{AE,i} - I_{AE,av})^2} \quad (4)$$

in the formulae (2) to (4),
i is a natural number of 1 to 350,
$I_{Al,i}$ is intensity of characteristic X-ray emitted by aluminum measured using an electron beam microanalyzer on the i-th intersection point among 350 intersection points of planes and a line perpendicular to a main surface of the catalytic layer, the planes being obtained by dividing the catalytic layer into 350 equal parts arranged in the thickness direction,
$I_{Al,av}$ is an arithmetic average value of the $I_{Al,i}$ given by the following formula (5):

$$I_{Al,av} = \frac{1}{350}\sum_{i=1}^{350} I_{Al,i} \quad (5)$$

$I_{AE,i}$ is intensity of characteristic X-ray emitted by the alkaline-earth metal element that is measured using the electron beam microanalyzer at the i-th intersection point, and
$I_{AE,av}$ is an arithmetic average value of the $I_{AE,i}$ given by the following formula (6):

$$I_{AE,av} = \frac{1}{350}\sum_{i=1}^{350} I_{AE,i} \quad (6)$$

10. The exhaust gas-purifying catalyst according to claim 9, wherein the alkaline-earth metal is barium.

* * * * *